United States Patent [19]

Brehm

[11] Patent Number: 5,427,352
[45] Date of Patent: Jun. 27, 1995

[54] ELECTROMAGNETIC VALVE

[75] Inventor: Werner Brehm, Hemmingen, Germany

[73] Assignee: Robert Bosch GmbH, Stuttgart, Germany

[21] Appl. No.: 289,755

[22] Filed: Aug. 12, 1994

[30] Foreign Application Priority Data

Sep. 22, 1993 [DE] Germany .......... 43 32 117.8

[51] Int. Cl.$^6$ .......... F16K 31/06
[52] U.S. Cl. .......... 251/64; 188/268; 251/129.16
[58] Field of Search .......... 251/129.16, 48, 64; 188/268

[56] References Cited

U.S. PATENT DOCUMENTS

| | | | |
|---|---|---|---|
| 2,375,818 | 5/1945 | Peters | 188/268 X |
| 2,868,494 | 1/1959 | Kearns et al. | 251/64 |
| 2,963,259 | 12/1960 | Heyer et al. | 251/48 |
| 3,110,262 | 11/1963 | West | 188/268 X |
| 3,198,996 | 8/1965 | Vollprecht | 251/129.16 X |
| 3,440,931 | 4/1969 | Eastin | 251/48 X |
| 4,481,974 | 11/1984 | Schmitt | 251/64 X |
| 4,535,816 | 8/1985 | Feder et al. | 251/48 X |

FOREIGN PATENT DOCUMENTS 4132816 11/1993 Germany .

*Primary Examiner*—Stephen M. Hepperle
*Attorney, Agent, or Firm*—Michael J. Striker

[57] ABSTRACT

The electromagnetic valve includes a magnetic housing (11, 12, 13), an electromagnetic coil (15) received in the magnetic housing and a plurality of movable parts including a movable magnetic armature (23,36) and a movable valve stem device (58) for valve opening and closing. To provide a damping of the motion of the movable parts, at least one of the movable parts (23, 36, 58), advantageously a part of the armature, is provided with a hollow compartment (72) and a damping mass (74) at least partial filling the hollow compartment (72). The volume of the hollow compartment (72) is greater than the volume of the damping mass (74) so that motions of the magnetic armature and other parts are damped by the frictional and impact losses occurring in the damping mass (74).

10 Claims, 1 Drawing Sheet

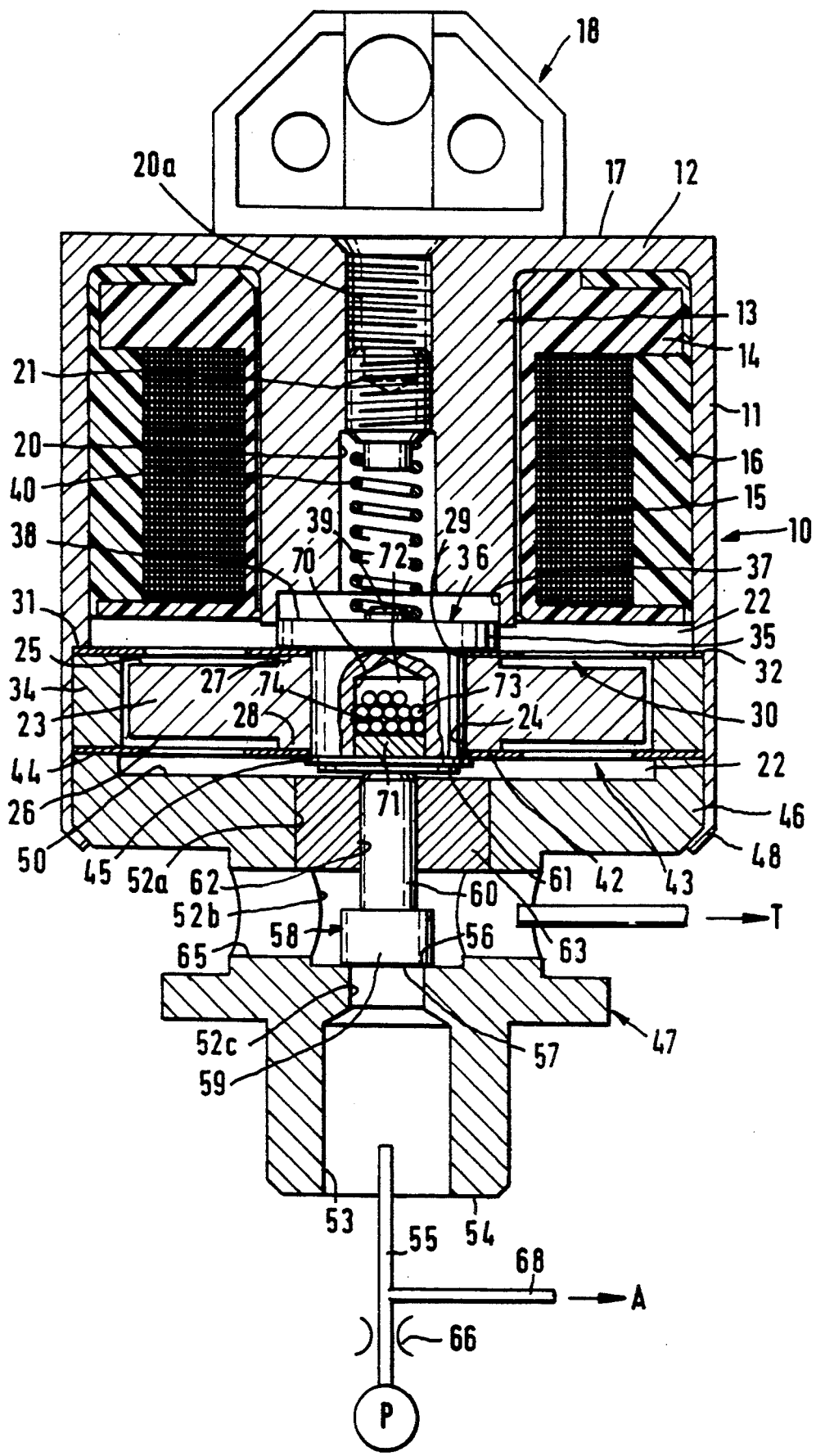

ELECTROMAGNETIC VALVE

BACKGROUND OF THE INVENTION

The present invention relates to an electromagnetic valve and, more particularly, to a pressurized medium regulating valve for an automatic transmission of a motor vehicle.

An electromagnetic valve is known comprising a magnetic housing, a electromagnetic coil received in the magnetic housing and a plurality of movable parts including a movable magnetic armature and a movable valve stem means for valve opening and closing.

Numerous embodiments of this type of electromagnetic valve are known and are, among other applications, used as a pressurized medium regulating valve in an automatic transmission of a motor vehicle. This type of pressurized medium regulating valve is described, for example, in German Published Patent Application 41 32 816. In order to damp the motions of the armature in this type of valve, its armature compartment must be already filled during assembly with a pressurized medium (oil). This type of hydraulic and/or viscous damping of the armature and/or the valve movable parts has however considerable disadvantages. A uniformly invariant filling of all valves during the manufacture of a number of electromagnetic valves in series with the pressurized medium can be guaranteed only by considerable effort and expense. Moreover a considerable number of steps are required for sealing the armature compartment. Since the gap height to a very large extent (to the third power) influences the damping in the hydraulic and/or viscous damping, already reduced manufacturing tolerances lead to a considerable variation in the valve characteristic curve. Furthermore hydraulically damped electromagnetic valves of this type are to a large extent sensitive to dirt and/or contamination, since dirty or contaminated pressurized medium can be forced into the armature compartment by a required volume or pressure balancing. Particularly that can lead easily to valve failure, because of contamination by ferromagnetic particles. The hydraulic and/or viscous damping effects the valve characteristic curve to a particularly large extent because of the large changes in the viscosity of the pressurized medium with temperature change. If the electromagnetic valve is used, for example as a pressurized medium regulating valve in an automatic transmission of a motor vehicle, the standard operating temperature range of the valve is from 230° to 420°K. The viscosity of the pressurized medium used for damping changes to a great extent in this temperature range. The viscosity of the pressurized medium can be changed in this range by as much as a factor of 3000. Because of that, it is nearly impossible to produce electromagnetic valves of this type with a nearly constant valve characteristic curve and uniform dynamics.

SUMMARY OF THE INVENTION

It is an object of the present invention to provide an electromagnetic valve of the above-described type which does not have the above-described disadvantages.

This object and others which will be more apparent herein after are attained in an electromagnetic valve comprising a magnetic housing, a electromagnetic coil received in the magnetic housing and a plurality of movable parts including a movable magnetic armature and a movable valve stem means for valve opening and closing.

According to the present invention, at least one of the movable parts is provided with a hollow compartment and a damping mass at least partial filling the hollow compartment and the volume of the hollow compartment is greater than the volume of the damping mass.

The electromagnetic valve, especially the pressurized medium regulating valve for an automatic transmission of a motor vehicle, according to the invention has the advantage that a satisfactory damping of the armature and/or valve moving parts is possible with comparatively simple means. Since the damping occurs without filling the armature compartment with oil, a nearly temperature independent damping constant results. The sealing of the armature compartment of the electromagnetic valve is, in contrast to the pressurized medium filled armature compartment of the prior art, comparatively easy, since only the protection of the compartment from dirt particles is required without a volume and/or pressure balancing. An electromagnetic valve of this type is substantially less sensitive to tolerances in gap height at the movable parts, since the gap height at that location no longer has any influence on the damping of the armature and/or valve component motions.

It is particularly advantageous when the hollow compartment containing the damping mass is formed in one of the parts of the magnetic armature, since then eventually occurring transverse loads do not act on the valve stem, but can be taken by the support for the magnetic armature.

To guarantee a satisfactory guiding of the moving parts of the valve and to avoid transverse loads, it is advantageous when the hollow compartment containing the damping mass is symmetric and its symmetry axis is coincident with the symmetry axis of the magnetic armature and/or the valve stem. Since these parts are usually cylindrical and their symmetry axis is usually coincident with the longitudinal axis of the electromagnetic valve, the hollow compartment is advantageously a cylindrical shape.

In a preferred embodiment of the electromagnetic valve the damping mass consists of a plurality of individual bodies, since then a particular satisfactory damping is possible because of the frictional losses and impact losses occurring during the motions of the valve parts.

It is especially advantageous when the individual bodies forming the damping mass at least partially comprise a material whose impact number is substantially less than 1. Because of that, the collision or impact events between the individual bodies during the motions of the valve parts are considerably inelastic in nature so that a good damping effect is obtained.

In another embodiment of the invention the electromagnetic valve has a hollow compartment in one of its moving parts filled at least partially with a liquid acting as a damping mass for motion of the valve parts. The liquid selected should have a comparatively large internal friction. Mercury is an example of a suitable damping liquid.

BRIEF DESCRIPTION OF THE DRAWING

The objects, features and advantages of the present invention will now be illustrated in more detail by the following detailed description, reference being made to the accompanying drawing in which:

The sole FIGURE is a longitudinal cross-sectional view through an electromagnetic valve according to the invention.

DESCRIPTION OF THE PREFERRED EMBODIMENT

The electromagnetic valve 10 has a somewhat beaker or cup-shaped magnetic housing 11 having a base 12. A centrally located cylindrical electromagnet core 13 extends from the base 12 into the interior of the magnetic housing 11. A coil body 14 with a coil 15 is arranged around this electromagnetic core 13 and embedded in a plastic material for sealing and fixing, e.g. by injection. A plastic plug 18 on the outside 17 of the base 12 has unshown contact terminals which are connected in a known manner with the coil 15.

The electromagnet core 13 has a throughgoing central longitudinal passage 20 whose end portion which is closest to the base 12 has an internal thread 20a and which is closed by the adjusting screw 21 engaged in the internal thread. It is provided with an unshown coating for sealing.

An armature compartment 22 is formed in the magnetic housing 11 under the coil body 14. The elastically supported armature disk 23 which in this embodiment is a disk-like flat armature part, is located in the armature compartment 22. It is provided with a central throughgoing passage 24 and has circular collars 27 and 28 on its upper side 25 and its lower side 26 respectively around the central passage 24.

A resilient diaphragm 30 provided with throughgoing openings contacts with its inner edge 29 on the upper collar 27. The outer edge 31 of the resilient diaphragm 30 contacts on a circular shoulder 32 in the wall of the magnet magnetic housing 11 and spaced from the coil body 14. The resilient diaphragm 30 is pressed at its outer edge 31 against the circular shoulder 32 by the flow conducting ring 34. The inner diameter of the flow conducting ring 34 is greater than the outer diameter of the armature disk 23. The inner edge 29 of the resilient diaphragm 30 is clamped between the upper collar 27 of the armature disk 23 and the flange-like closure plate 35 of a bearing bolt 36, which extends into the longitudinal passage 20. The closure plate 35 projects into a cylindrical cavity 37, which is arranged in the proximal end of the electromagnet core 13 peripheral to the longitudinal passage 20.

A guide pin 39 is centrally positioned on the upper end 38 of the closure plate 35 and is embraced by one end of a coil spring 40 in the central longitudinal passage 20 which bears on the closure plate 35. The other end of the coil spring 40 bears on the adjusting screw 21.

The inner edge 42 of a second resilient diaphragm 43, which is provided with throughgoing holes in a manner similar to the first resilient diaphragm 30, bears on the lower collar 28 of the armature disk 23, and its outer edge 44 contacts the flow conducting ring 34. The inner edge of the second resilient diaphragm 43 is pressed against the lower collar 28 of the armature disk 23 by a securing ring 45, which cooperates with the bearing bolt 36.

The outer edge 44 of the second resilient diaphragm 43 is pressed by the bearing flange 46 of a valve connecting member 47 against the flow conducting ring 34. The valve connecting member 47 is held in place by a flanged edge part 48 of a lower portion of the magnetic housing 11 and is rigidly attached to it.

The magnetic circuit of the electromagnetic valve 10 is formed by the magnetic housing 11 that receives the electromagnetic coil 15, the flow conducting ring 34 and the movable parts, including a magnetic armature comprising the armature disk 23 and the bearing bolt 36. The armature disk 23 together with the bearing bolt 36 forms the magnetic armature of the magnetic circuit, i.e. the moving parts of the magnetic circuit. The moving parts and the fixed parts of the magnetic circuit are as a result made from a material which is sufficiently magnetically conducting. To avoid magnetic losses the valve connecting member 47 and the valve parts located in it are made from a nonmagnetically conducting material.

A cylindrical depression 50, whose diameter corresponds approximately to the inner diameter of the flow conducting ring 34, is provided in the end of the bearing flange 46 of the valve connection member 47 nearest to the armature disk 23. The bearing flange 46 and the connected valve connecting member 47 are provided with a central double-stepped longitudinal throughgoing hole, whose hole sections are indicated with 52a to 52c as one goes from the depression 50 to the valve connecting member 47. The hole section 52c is connected with a coaxial passage 53, which extends from the outside end of the valve connecting member 47 to the hole section 52c and which is connected with the pressurized medium tube 55.

The transition region from the hole section 52b to hole section 52c acts as a valve seat 56 and cooperates with the proximal end 57 of a valve stem 58 having two cylindrical sections 59,60. The cylindrical section 59 of the larger diameter cooperates with its proximal end 57 with the valve seat 56. The diameter of the cylindrical section 59 is somewhat larger than that of the valve seat 56 formed in this embodiment as a flat valve seat.

The valve stem 58 is guided with its cylindrical section 60 of smaller diameter in the longitudinal passage 62 of a cylindrical guiding insert 63, which fits in the hole section 52a. The cylindrical section 60 extends into the armature compartment 22 and cooperates there with the free lower or nearest end 61 of the bearing bolt 36.

The hole section 52b is joined with a transverse passage 65, that is connected with an unshown container, whose connection is indicated with a T. The pressurized medium tube 55 is connected with a pressurized medium source P and has a throttle portion 66 in it. A consuming device tube 68 branches from the pressurized medium tube 55 between the throttle portion 66 and the coaxial passage 53. The consuming device tube 68 is connected in an unshown manner to a consuming device, whose connection is indicated with an A in the FIGURE.

The electromagnetic valve 10 is used in hydraulic bridge circuit as an electrically adjustable pressurized medium control valve in connection with the throttle portion 66. The pressure in the consuming device tube 68 corresponds to that resulting from a balancing of the pressurized medium force exerted on the valve stem 58 by the pressurized medium from the pressurized medium tube 55 and the force of the coil spring 40 acting on the valve stem 58 via the bearing bolt 36. When a current flows through the coil 15, the armature disk 23 is drawn toward the coil against the action of the coil spring 40. The force on the valve stem 58 due to the coil spring 40 is reduced thus by the magnetic force acting on the armature. The pressurized medium force from the pressurized medium tube 55 on the valve stem 58 required for force is thus reduced, i.e. the pressure in the consuming device tube 68 adjusts itself so that it is lower. Thus a falling excitation current-pressure-characteristic curve can be realized with the electromagnetic valve according to the invention.

In operation, the armature disk 23 and the bearing bolt 36 perform the electrical set value controlling adjustments. The valve stem 58 bears with its end proximal to the armature continuously on the bearing bolt 36, because of the action of the pressure arising on the lower end 57 of the valve stem 58 at the valve seat. To damp the motion of the movable components (i.e. the armature disk 23 and the bearing bolt 36) as well as the valve stem 58, a blind hole 70 is provided in the bearing bolt 36, which extends into it from the end nearest the valve stem 58 and which is closed by an inserted stopper 71. The closed blind hole 70 provides a closed hollow compartment 72 in the bearing bolt 36, which is filled with a number of individual bodies 73, that cooperate together to act as a damping mass 74. The hollow compartment 72 is only partially filled with the individual bodies 73 comprising the damping mass 74, i.e. its volume is larger than the volume of the damping mass 74, so that shifting motions of the damping mass 74 occur during motion of the bearing bolt 36. Frictional and impact losses occur during the shifting motions of the individual bodies 73 by which the motion energy is reduced. The motion of the bearing bolt 36 and/or of the magnetic armature is, as a result, damped. The motions of the magnetic armature (armature disk 23 and the bearing bolts 36) and/or the valve element 58 are especially well damped, when the impact losses during motions and especially pivotal motions are as large as possible. Besides the impact or collision number of the cooperating individual bodies 73 should be as small as possible relative to a theoretical impact number of one. An impact or collision number of one corresponds to a completely elastic collision, while the impact number zero is the characteristic number for completely inelastic collisions.

By suitable selection of the form, size and impact number for the individual bodies 73 in relation to and in consideration of the volume of the hollow compartment 72 and in relation to and in consideration of the mass of the movable parts, the damping of the electromagnetic valve is adjusted and/or optimized. The equipping of the hollow compartment 72 with solid individual bodies 73 has the advantage that the damping is comparatively independent of temperature and manufacturing tolerances. The damping mass 74 is economically and simply formed from lead shot and/or lead balls.

To avoid transverse stresses and strains during motion of the armature disk 23 and/or valve stem 58, it is particularly meaningful, when the axial passage of the blind hole 70 is coaxial with the longitudinal axis of the electromagnetic valve and/or with the longitudinal axis of the bearing bolt 36 and/or the armature disk 23.

It is also possible to form the damping mass 74 by a fluid instead of the individual bodies 73. This fluid should have an internal friction which is as large as possible to provide a good damping behavior. The selection of the fluid forming the damping mass 74 depends however to a considerable extent on the temperature range in which the electromagnetic valve is used. The hollow compartment 72 can be filled with mercury when the electromagnetic valve is used as a pressurized medium regulating valve n an automatic transmission for a motor vehicle. In this application the volume of the mercury and/or the damping mass 74 is less than the volume of the hollow compartment 72.

Instead of the stopper 71 the blind hole 70 can also be closed by a ball pressed into it or other closure means.

The structure of the movable parts of the valve is not limited to that described in the above embodiment of the electromagnetic valve with a flat armature guided by a resilient diaphragm. It is also possible without more to arrange the hollow compartment with the damping mass also in another type of electromagnetic valve, for example, in an electromagnetic valve with a slidable cylindrical armature.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. Electromagnetic valve comprising a magnetic housing (11, 12, 13), an electromagnetic coil (15) received in the magnetic housing and a plurality of movable parts (23,36) comprising a movable magnetic armature and a movable valve stem means (58) for valve opening and closing, wherein at least one of the movable parts (23, 36, 58) is provided with a hollow compartment (72) having a volume and a damping mass (74) having a volume, said damping mass (74) at least partially fills the hollow compartment (72) and the volume of the hollow compartment (72) is greater than the volume of the damping mass (74) so that frictional and impact losses occur in the damping mass (74) during motion of the movable parts.

2. Electromagnetic valve as defined in claim 1, wherein said hollow compartment (72) is provided in one of said parts (36) of said magnetic armature.

3. Electromagnetic valve as defined in claim 1, wherein said magnetic armature has a symmetry axis and said hollow compartment (72) is symmetric to said symmetry axis of said magnetic armature.

4. Electromagnetic valve as defined in claim 1, wherein said damping mass (74) consists of a plurality of individual bodies (73).

5. Electromagnetic valve as defined in claim 4, wherein said individual bodies are made at least partially from a material having an impact number much smaller than one but larger than zero.

6. Electromagnetic valve as defined in claim 1, wherein said damping mass (74) consists of a liquid.

7. Electromagnetic valve as defined in claim 6, wherein said liquid has a comparatively high internal friction.

8. Electromagnetic valve as defined in claim 6, wherein said liquid consists of mercury.

9. Electromagnetic valve as defined in claim 1, wherein said magnetic armature is a flat armature, and further comprising at least one resilient diaphragm (30,43) for guiding said magnetic armature in said magnetic housing (11).

10. Electromagnetic valve as defined in claim 1, consisting of a pressurized medium regulating valve for an automatic transmission of a motor vehicle.

* * * * *